(12) United States Patent
Rommelmann et al.

(10) Patent No.: US 7,307,531 B2
(45) Date of Patent: Dec. 11, 2007

(54) COUPLER BOARD FOR WIRELESS COMMUNICATION WITH MULTIPLE MEMORY DEVICES

(75) Inventors: Heiko Rommelmann, Penfield, NY (US); Robert Allen Koontz, Webster, NY (US); Alberto Rodriguez, Webster, NY (US); William H. Phipps, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 207 days.

(21) Appl. No.: 11/133,579

(22) Filed: May 20, 2005

(65) Prior Publication Data

US 2006/0261947 A1 Nov. 23, 2006

(51) Int. Cl.
*G08B 13/14* (2006.01)

(52) U.S. Cl. .................. 340/572.1; 340/572.8; 340/572.7; 399/75

(58) Field of Classification Search ............. 340/572.1, 340/10.32, 10.41, 5.32, 572.8, 572.7; 399/8, 399/111, 12, 24, 75, 33
See application file for complete search history.

(56) References Cited

U.S. PATENT DOCUMENTS

| | | | |
|---|---|---|---|
| 5,499,017 A | * | 3/1996 | Beigel .................. 340/572.1 |
| 5,629,981 A | | 5/1997 | Nerlikar |
| 6,016,409 A | | 1/2000 | Beard et al. |
| 6,178,549 B1 | * | 1/2001 | Lin et al. .................. 717/124 |
| 6,377,764 B1 | | 4/2002 | Morris-jones |
| 6,532,351 B2 | | 3/2003 | Richards et al. |
| 6,865,349 B2 | | 3/2005 | Silence et al. |
| 6,995,651 B2 | * | 2/2006 | Amtmann et al. ......... 340/5.32 |
| 7,107,073 B1 | * | 9/2006 | Berthaud .................. 455/557 |
| 2005/0028100 A1 | | 2/2005 | Rommelmann et al. |

* cited by examiner

*Primary Examiner*—Anh V. La
(74) *Attorney, Agent, or Firm*—Wiggin and Dana LLP

(57) ABSTRACT

A coupler board includes an antenna that generates an electromagnetic field for wireless communication of data with multiple memory devices. The memory devices have data associated with operation of the machine stored therein, and may be configured as customer replaceable unit monitors (CRUMs) or system operation keys (SOKs). The memory devices may be in the form of radio frequency identification (RFID) tags. The electromagnetic field may have a dual-lobe radiation pattern to communicate with memory devices on either side of the coupler board. In one embodiment, the machine is a printing apparatus.

23 Claims, 3 Drawing Sheets

COUPLER BOARD FOR WIRELESS COMMUNICATION WITH MULTIPLE MEMORY DEVICES

BACKGROUND

The present disclosure relates generally to data communication with memory devices within a machine. More specifically, the present disclosure relates to a coupler board for wireless data communication with multiple memory devices within a machine.

A common trend in machine design is to organize a machine on a modular basis, wherein certain distinct subsystems of the machine are bundled together into modules which can be readily removed from the machine and replaced with new modules of the same or similar type. A modular design facilitates great flexibility in the business relationship with the customer. By providing subsystems in discrete modules, visits from a service representative can be made very short, since all the representative has to do is remove and replace a defective module. Actual repair of the module may take place away at the service provider's premises. Further, some customers may wish to have the ability to buy modules "off the shelf," such as from an equipment supply store. Indeed, it is possible that a customer may lease the machine and wish to buy a succession of modules as needed. Further, the use of modules, particularly for expendable supply units (e.g., copier and printer toner bottles) are conducive to recycling activities. In addition, modules may be used for anti-theft or security purposes, for example where the module may be removed by the user to disable the machine (e.g., face plates on automobile radios and wireless network cards installed in laptop computers).

In order to facilitate a variety of business arrangements among manufacturers, service providers, and customers, it is known to provide these modules, also known as "Customer Replaceable Units" or CRUs, with electronically-readable memory, also known as "Customer Replaceable Unit Monitors" or CRUMs, which, when the module is installed in the machine, enable the machine to both read information from the memory and also write information to the memory. The information stored in the CRUM can be used to monitor usage of the module as well as other functions related to the module. For example, U.S. Pat. No. 6,016,409 issued Jan. 18, 2000 and entitled "System For Managing User Modules in a Digital Printing Apparatus", which is incorporated by reference herein in its entirety, describes various data that may be stored in a CRUM and various functions that may be performed using this data.

Another common trend in machine design is to manufacture a single base "platform" in hardware, and then use software controls in communication with the hardware to enable or disable one or more optional features. This may include, for example, both software controlled operational features as well as software controlled hardware features. For instance, with reference to digital xerographic "laser printers," a basic hardware platform capable of outputting 40 pages per minute (ppm) can be modified to output pages at 30 ppm or even 20 ppm by altering the control software. Typical techniques for slowing down a basic hardware platform include simply running the various electric motors at slower speeds, or deliberately skipping an operational cycle (not feeding a print sheet, and withholding image data) for one or more of a given number of hardware cycles. The advantages of this business model include the desirability of selling different speed-rated machines at different prices to meet market demands, and also the ability to speed up a slowed-down machine (such as by loading in new software) should an existing customer decide he wants a faster machine. In a manufacturing, re-manufacturing, or repair environment, this arrangement us useful in minimizing the number of hardware configurations that must be manufactured or repaired.

Machines sold, installed, and serviced will typically require either customer interaction or service representative intervention to enable some or all of the possible optional features. One method of enabling and disabling the various optional features is to provide a secure EEPROM (Electrically Erasable Programmable Read Only Memory) device or other non-volatile memory (NVM) device as a system operation key (SOK). The SOK, which may be in the form of a card or other device that can be removed and installed by the customer or service representative, has data stored therein that is readable by the machine to control the optional features of the machine. To enable or disable the various optional features, the customer or service representative simply installs a SOK encoded with the appropriate data into the machine.

While the incorporation of removable memory devices such as SOKs and CRUMs in a machine can enhance the machine's functionality, the use of such memory devices requires that the machine include a means for communicating data between the memory devices and the control circuitry resident in the machine. For example, this may include the use of separate electrical contact terminals, harnesses, and other hardware for each SOK and/or CRUM installed in the machine. In another example, U.S. Patent Application Publication No. US 2005/0028100 published Feb. 3, 2005 and entitled "Wireless Machine Post-Launch Configuration and Option Upgrade," which is incorporated by reference herein in its entirety, describes a secure EEPROM device or other NVM with a wireless interface for a SOK. In yet another example, U.S. Pat. No. 6,377,764 issued Apr. 23, 2003 and entitled "Method and Apparatus for Communication, Without A Solid Medium, Among Control Boards in a Printing Apparatus," which is incorporated by reference herein in its entirety, describes a digital printing apparatus in which one or more modules has a board therein, which is able to communicate with another board within the apparatus by infrared or other wireless communication. Such wireless communication obviates the need for large and expensive wire harnesses.

BRIEF SUMMARY

According to one aspect, there is provided a machine comprising a coupler board having an antenna attached thereto. A first memory device has stored therein first electronic data associated with operation of the machine, and a second memory device has stored therein second electronic data associated with operation of the machine. The first and second memory devices are positioned at least partially within an electromagnetic field generated by the antenna, and the first and second electronic data are communicated to the coupler board using the electromagnetic field.

According to another aspect, there is provided a method of communicating data between a coupler board in a machine and removable portions of the machine. The method comprises: generating an electromagnetic field using an antenna attached to the coupler board; positioning a first memory device at least partially within the electromagnetic field, the first memory device being attached to a first removable portion of the machine and having stored therein first electronic data associated with operation of the machine; communicating the first electronic data between the coupler board and the first memory device using the electromagnetic field; positioning a second memory device at least partially within the electromagnetic field, the second memory device being attached to a second removable portion of the machine and having stored therein second electronic data associated with operation of the machine; and communicating the second electronic data between the coupler board and the second memory device using the electromagnetic field.

According to yet another aspect, there is provided a printing apparatus comprising a coupler board having an antenna attached thereto. A first memory device has stored therein first electronic data associated with operation of the printing apparatus, and a second memory device has stored therein second electronic data associated with operation of the printing apparatus. The first and second memory devices are positioned at least partially within an electromagnetic field generated by the antenna, and the first and second electronic data are communicated to the coupler board using the electromagnetic field.

BRIEF DESCRIPTION OF THE DRAWING

Referring now to the figures, which are exemplary embodiments, wherein like items are numbered alike.

DETAILED DESCRIPTION

Figure 1:
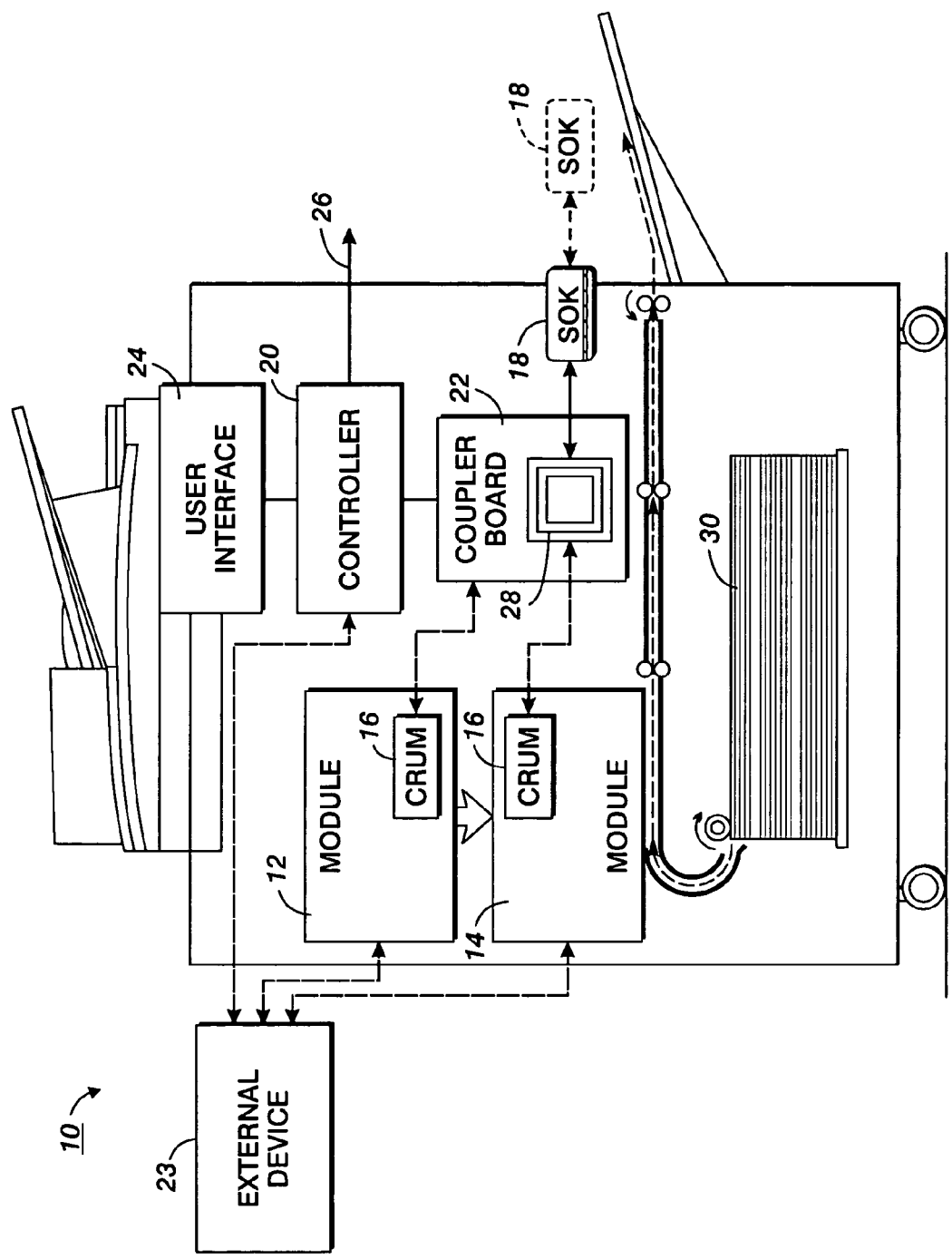
FIG. 1 is a schematic depiction of a machine including a coupler board having an antenna that generates an electromagnetic field for wirelessly communicating data between the coupler board and two or more memory devices.

FIG. 1 is a schematic depiction of a machine 10 including replaceable modules 12 and 14, also known as "Customer Replaceable Units" or CRUs. Attached to each of the modules 12 and 14 is a memory device 16, which is configured as a CRUM (Customer Replaceable Unit Monitor). Typically, each CRUM 16 includes a non-volatile memory, such as in the form of an EEPROM (Electrically Erasable Programmable Read Only Memory), which retains data relevant to the identification, function, and performance of the respective module 12 or 14. Because it includes a non-volatile memory, the CRUM 16 can act as a "scratch pad" for retaining the data stored therein, which travels with the replaceable modules 12 and 14, even when the modules 12 and 14 are not installed in the machine 10. As used herein, a "memory device" is any device including non-volatile, electronically-readable memory in which electronic data associated with the machine 10 may be written to and read from.

The machine 10 also includes a memory device 18, which is configured as a removable system operation key (SOK) for enabling and disabling various options of the machine 10. The SOK 18 includes a non-volatile memory, such as in the form of an EEPROM, which has data stored therein that is readable by the machine 10 to control configurable features of the machine 10. To enable or disable the various features, a customer or service representative simply inserts a SOK 18 encoded with the appropriate data into the machine 10.

The operation of the machine 10 is generally controlled by a controller 20, which may include one or more microprocessors, application-specific integrated circuits (ASICs), or other signal processing devices encoded with instructions to operate the machine 10. When the modules 12 and 14 and SOK 18 are installed in the machine 10, data is communicated between the CRUMs 16, SOK 18, and the controller 20 via a coupler board 22. In addition, data may be communicated between a device 23 external to the machine 10 and one or both of the modules 12 and 14 and the controller 20. Controller 20 may also communicate with users through a user interface 24 or through a network connection 26, such as over phone lines or the Internet.

As used herein, a "coupler board" is any physical component of the machine 10 that includes circuitry for communicating data to and/or from the various memory devices (e.g., CRUMs 16 and SOK 18). For example, the coupler board 22 may include a printed circuit board, a housing, a platform, or the like, which supports microprocessors, ASICS, electronic circuitry, or the like, through which data are communicated to and/or from the memory devices 16 and 18. While shown as separate components, it is contemplated that the controller 20 and the coupler board 22 may be a single component (e.g., a single printed circuit board).

The coupler board 22 includes an antenna 28 that generates an electromagnetic field for wirelessly communicating data between the coupler board 22 and two or more memory devices (e.g., CRUMs 16 and/or SOK 18). The memory devices 16 and 18 are positioned at least partially within the electromagnetic field generated by the antenna 28, and electronic data are communicated between the coupler board 22 and the memory devices 16 and 18 using the electromagnetic field. Advantageously, the coupler board 22 eliminates the need for separate sets of hardware (e.g., separate contact terminals, harnesses, antennae, etc.) to communicate with each of the memory devices 16 and 18. The elimination of separate sets of hardware for each memory device 16 and 18 reduces the number of parts needed to manufacture the coupler board 22 and, as a result, is believed to reduce the manufacturing cost of the machine 10. Furthermore, the use of a wireless interface between the coupler board 22 and the memory devices 16 and 18 reduces the accuracy, when compared to a hardwired connection, with which the memory devices 16 and 18 must be positioned within the machine 10. In other words, a hardwired connection typically requires that contact terminals on the coupler board and the memory devices be in intimate contact, which requires accurate positioning of the memory devices with respect to the coupler board. On the other hand, with the coupler board 22 of FIG. 1, the memory devices 16 and 18 need only be at least partially within the electromagnetic field generated by the antenna 28 to ensure data communication between the memory devices 16 and 18 and the coupler board 22.

For purposes of discussion herein, the machine 10 is depicted as a printing apparatus, such as a digital printer of the ink jet or "laser" (electrophotographic or xerographic) variety, or a digital or analog copier, and the modules 12 and 14 are depicted as hardware devices related to printing, such as a marking material supply module and a marking device module, respectively. It is contemplated, however, that the machine 10 may be any electrical, electronic, mechanical, electromechanical device configured to perform one or more functions, and the modules 12 and 14 may be any component, group of components, system, or subsystem of the machine 10. Furthermore, while the memory devices 16 and 18 are described as CRUMs and SOKs related to the printing apparatus, it is contemplated that the memory devices 16 and 18 may include any device having non-volatile, electronically-readable memory in which electronic data associated with the machine 10 may be written to and read from.

In the embodiment of FIG. 1, sheets on which images are to be printed are drawn from a stack 30 and move relative to the marking device module 14, where the individual sheets are printed upon with desired images. The marking material for placing marks on various sheets by marking device module 14 is provided by marking material supply module 12. If machine 10 is an electrostatographic printer, marking material supply module 12 may include a supply of toner, while marking device module 14 may include any number of hardware items for the electrostatographic process, such as a photoreceptor or fusing device. In the well-known process of electrostatographic printing, the most common type of which is known as "xerography," a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finally divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate, such as paper from the stack 30, and the image affixed thereto to form a permanent record of the image.

In the ink-jet context, the marking material supply module 12 includes a quantity of liquid ink, and may include separate tanks for different primary-colored inks, while marking device module 14 includes a printhead. In either the electrostatographic or ink-jet context, "marking material" can include other consumed items used in printing but not precisely used for marking, such as oil or cleaning fluid used in a fusing device. Of course, depending on a particular design of a machine 10, the functions of modules 12 and 14 may be combined in a single module, or alternatively, the marking device may not be provided in an easily replaceable module such as 14. Further, there may be provided several different marking material supply modules 12, such as in a full color printer. In general, it is contemplated that the machine may include one or more replaceable modules, and it is expected that, at multiple times within the life of machine 10, one or more of these modules need to be removed or replaced. In the current market for office equipment, for example, it is typically desirable that modules such as 12 and 14 be readily replaceable by the end user, thus saving the expense of having a representative of the vendor visit the user.

There are many different types of data which could be stored in CRUM 16. In a broad sense, the CRUM could retain a serial number of the particular module, and identification of the module by the serial number can be used by the machine in which the module is installed to determine, for example, whether the particular installed module is compatible with the machine. In other types of CRUM systems, the CRUM can further act as an "odometer" to maintain a cumulative count indicating use of the module. For example, where the module is to be used with a printing apparatus, the count may indicate the number of prints which have been output using the particular module. In many contexts, a system will use the count in the CRUM to permit a certain predetermined number of times that the module may be used (e.g. a predetermined number of prints to be output with the particular module), and then block further use of the module. In more sophisticated versions of the odometer concept, there may be provided within a single CRUM provision for maintaining multiple usage counts: for instance, in addition to counting the number of times the module has been used (e.g., the number of prints output using the module) since it was built, a second count may be maintained of how many times the module was used since it was last remanufactured (refilled or repaired). In another example, a second count may serve as a check on the first count, such as in a system whereby the first count must be somehow mathematically consistent with the second count, so that any person trying to tamper with either the first or second count will have to know to make the second count consistent with the first count. Also, in particular with marking material supply modules, different independent print counts may be associated with the different supplies of color marking materials.

Another type of data which may be stored in a particular location in the non-volatile memory of the CRUM 16 may relate to specific performance data associated with the module, so that the module can be operated in an optimal, or at least advisable, manner. For instance, in the ink jet context, it is known to load data symbolic of optimal voltage or pulse width in the CRUM, so that the particular module may be optimally operated when the module is installed. In the xerographic context, it is known to load into a CRUM module specific data such as relating to the tested transfer efficiency of toner from a photoreceptor to a print sheet: this information is useful for an accurate calculation of toner consumption. Again, there may be provided any number of spaces in the of the CRUM memory for retaining information relating to different performance data.

Other types of data which may be included in the non-volatile memory in CRUM 16 include one or more serial numbers of machines, such as printers, in which the particular module is or has been installed: this may be useful for tracing faults in the module or among a population of machines. Also, if the particular module is intended to be remanufactured, another useful piece of data to be loaded into the memory can be the date of the last remanufacture of the module, as well as a code relating to some detail of the remanufacture, which may be symbolic of, for instance, a location of the remanufacture, or the specific actions that were taken on the module in a remanufacturing process.

Stored in the SOK 18 are data used by the controller 20 to configure machine 10 option attributes for enabling or disabling various optional features of the machine. These machine option attributes may be associated with a particular user of the machine (e.g., permissions provided to a person using the copier) or may be associated with the machine in general (e.g., speed and/or voltage settings associated with the country in which the machine is used, optional features available under a sales contract or lease associated with the machine, etc.). Examples of these optional features may include but are not limited to: device/machine speed; machine stand alone mode or network connected mode; scanning enabled; scan to email; scan to Internet Fax; network server Fax enabled; job based accounting; etc. Other data that may be stored in the SOK 18 may include software updates, settings updates, and the like that are provided by the manufacturer of machine 10.

The SOK 18 may be of any convenient physical form. For example, the SOK 18 may be formatted as a card, which is received in a slot in the machine 10. While the machine of FIG. 1 shows only one SOK 18, it is contemplated that any number of SOKs 18 may be used. To enable or disable the desired features, the user or technician inserts the SOK 18 into the machine 10. After the SOK 18 has been installed, data stored in the SOK 18 is read by the coupler board 22 and is provided to the controller 20, which configures the appropriate option attributes in response to this data.

Figure 2:
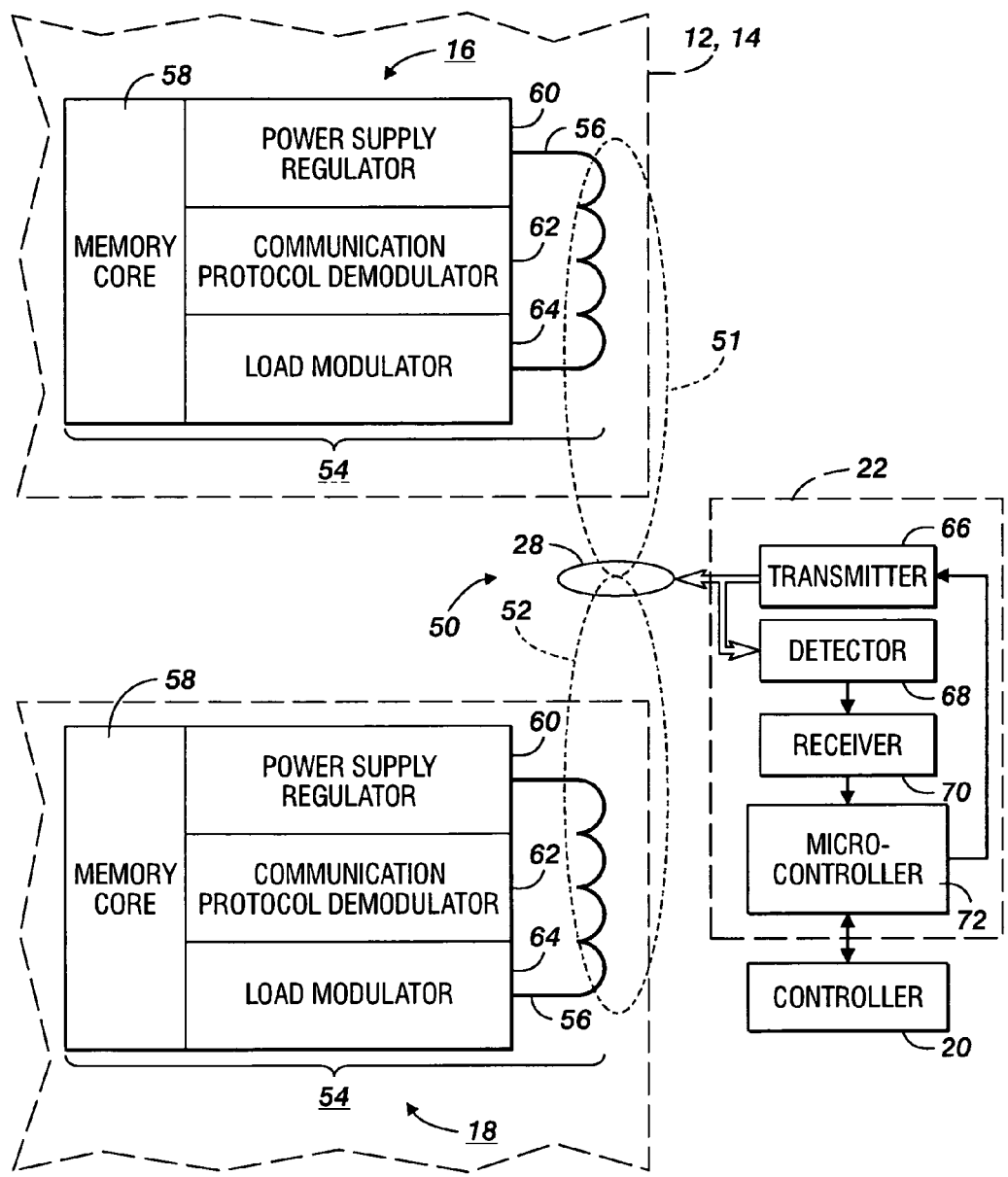
FIG. 2 is a schematic representation of two memory devices positioned in a dual-lobe electromagnetic field generated by the antenna on the coupler board.

FIG. 2 is a schematic representation of memory devices 16 and 18 positioned in an electromagnetic field 50 generated by the antenna 28 on the coupler board 22. The CRUM 16 is preferably permanently attached to a surface (either on the outside or the inside) of a particular module, such as a marking material supply module 12 or a marking device module 14; a portion of such a surface is shown in FIG. 2. While the memory devices depicted in FIG. 2 include a CRUM 16 and a SOK 18, it is contemplated that the devices positioned in the electromagnetic field 50 may include two CRUMs 16, two SOKs 18, or any combination of two or more memory devices.

In the embodiment shown, the memory devices 16 and 18 are each in the form of a passive radio-frequency identification (RFID) tag 54 that communicates data by way of electric and/or magnetic field coupling between an antenna 56 forming part of the tag 54 and the antenna 28 on the coupler board 22. The coupler board 22 acts as an RFID reader (also known as an interrogator). As will be described in further detail hereinafter, the electromagnetic field 50 generated by the antenna 28 has a dual-lobe radiation pattern, with one memory device (CRUM 16) positioned at least partially within a first lobe 51, and the other memory device (SOK 18) positioned at least partially within the second lobe 52.

Within each tag 54, data storage and processing as well as radio frequency (RF) communications functions are typically performed by one or more integrated circuit chips. For example, each tag 54 may include: a memory core 58 (e.g., an EEPROM), which stores the data associated with the CRUM 16 or SOK 18; a power supply regulator 60, which rectifies and otherwise conditions alternating current induced in the antenna 56 by a time-varying RF signal provided by the antenna 28 on the coupler board 22 for use in the tag 54 as a direct current power source; and receiver/emitter modules 62, 64 (e.g., compatible with the ISO 14443 standard) for demodulating and decoding incoming data from the received RF signal and superimposing outgoing data on the RF signal by load variation, respectively.

The coupler board 22 includes a transmitter 66 that generates the time-varying RF signal transmitted by the antenna 28. As a result of electromagnetic coupling between the tag antenna 56 and the coupler board antenna 28, a portion of the RF signal transmitted by the tag antenna 56 enters the coupler board antenna 28 and is separated from the transmitted signal by a detector 68 (e.g., an envelope detector). The separated signal is passed to a receiver 70, where it is amplified, decoded and presented via a microcontroller 72 to the controller 20.

Because the tags 54 are read together in the same RF field 50, the tags 54 may compete to transmit data at the same time. To prevent this, the coupler board 22 and tags 54 may employ an anti-collision technique, which allows the coupler board 22 to receive data from each tag 54 on a one-by-one basis. Any convenient anti-collision technique may be employed. For example, a so-called "gap pulse" technique may be used wherein, in response to the receiver 70 detecting signal collision from competing tags 54, the microcontroller 72 causes the transmitter 66 to transmit a gap pulse via antenna 28. When each tag 54 recognizes the gap pulse, it ceases further transmission of data until it counts a randomly generated number. Each tag 54 will finish counting the number in a different time and, as a result, will transmit is data at a different time.

Figure 3:
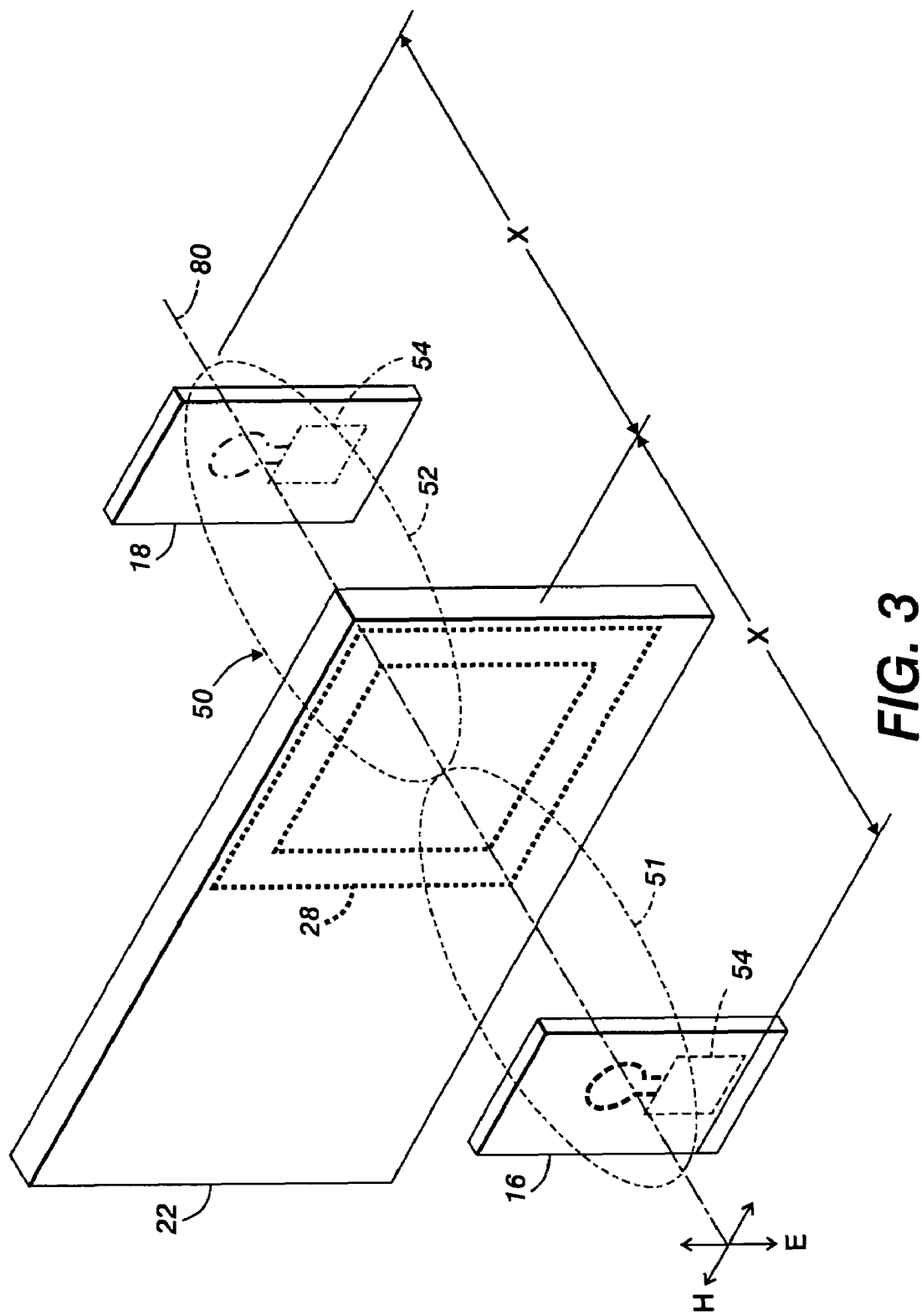
FIG. 3 is a perspective view of two memory devices positioned in the dual-lobe electromagnetic field generated by the antenna on the coupler board.

The embodiment of FIG. 3 is shown for purposes of example, and it will be appreciated that any system that communicates data by way of electric and/or magnetic field coupling with the antenna 28 on the coupler board 22 may be used. For example, while the embodiment of FIG. 3 depicts memory devices 16 an 18 in the form use of passive RFID tags 54, it will be appreciated that active RFID tags may be suitably used.

FIG. 3 is a perspective view of memory devices 16 and 18 positioned in the electromagnetic field 50 generated by the antenna 28 on the coupler board 22. In the embodiment of FIG. 3, the antenna 28 is disposed on, and is substantially coplanar with, the coupler board 22. For example, the coupler board 22 may be a printed circuit board and the antenna 28 may be formed from an electrically conductive trace formed on the printed circuit board. Alternatively, the antenna 28 may be formed from an electrical wire or a stamped or etched electrically conductive foil embedded within or attached to the surface of the coupler board 22. The antenna 28 may be of any convenient shape that provides the desired radiation pattern. For example, the antenna 28 may be shaped as a coil or loop.

As previously noted, the electromagnetic field 50 generated by the antenna 28 has a dual-lobe radiation pattern, with a first lobe 51 extending generally perpendicular to, and away from, one surface of the coupler board 22, and a second lobe 52 axially aligned with the first lobe 51 and extending generally perpendicular to, and away from, an opposite surface of the coupler board 22. The coupler board 22 is positioned between the two memory devices 16, 18, each of which are positioned at least partially in a lobe 51 or 52 of the electromagnetic field 50.

The lobes 51 and 52 may be substantially symmetrical with respect to the coupler board 22, such that the first lobe 51 has substantially the same shape as the second lobe 52. However, it is contemplated that the first and second lobes 51 and 52 may be asymmetrical. While the radiation pattern of the electromagnetic field 50 is shown to include only two lobes, it is contemplated that the radiation pattern may include additional lobes. For example, the first and second lobes 51 and 52 may form the primary lobes of a radiation pattern including smaller side lobes. The lobes 51 and 52 are shown as being generally oval in shape and generally symmetrical about a common axis 80, such that each of the lobes 51 and 52 have generally the same shape in both the vertical and horizontal planes (the so-called E and H planes). It is contemplated, however, that the radiation pattern of the electromagnetic field 50 may be different in the vertical and horizontal planes.

Advantageously, by providing a dual-lobe electromagnetic field 50, the coupler board 22 doubles the range over which it is effective in communicating with the memory devices 16 and 18. That is, where each lobe 51 and 52 extends a distance "x" from the antenna 28, the total range of the system is two times x. In comparison, if both memory devices 16 and 18 are placed on the same side of the coupler board 22, the total range of the system would be equal to x. By increasing the effective range of the system, the coupler board 22 provides a greater tolerance range for the placement of the memory devices 16 and 18.

Furthermore, where the lobes 51 and 52 are substantially symmetrical with respect to the coupler board 22, the coupling factor between each of the memory devices 16 and 18 and the antenna 28 is uniform. In other words each memory device 16 and 18 affects the circuitry on the coupler board 22 similarly. As a result, the quality of each communication channel between the antenna 28 and the memory devices 16 and 18 is easily determined (it is the same for both) and design of the coupler board circuitry is, therefore, simplified.

It should be understood that any of the features, characteristics, alternatives or modifications described regarding a particular embodiment herein may also be applied, used, or incorporated with any other embodiment described herein.

A number of embodiments have been described. Nevertheless, it will be understood that various modifications may be made without departing from the spirit and scope of the invention. Accordingly, other embodiments are within the scope of the following claims.

What is claimed is:

1. A machine comprising:
    a coupler board having an antenna attached thereto;
    a first memory device having stored therein first electronic data associated with operation of the machine, the first memory device being positioned at least partially within an electromagnetic field generated by the antenna; and
    a second memory device having stored therein second electronic data associated with operation of the machine, the second memory device being positioned at least partially within the electromagnetic field generated by the antenna, wherein the first and second electronic data are communicated to the coupler board using the electromagnetic field.

2. A method of communicating data between a coupler board in a machine and removable portions of the machine, the method comprising:
    generating an electromagnetic field using an antenna attached to the coupler board;
    positioning a first memory device at least partially within the electromagnetic field, the first memory device being attached to a first removable portion of the machine and having stored therein first electronic data associated with operation of the machine;
    communicating the first electronic data between the coupler board and the first memory device using the electromagnetic field;
    positioning a second memory device at least partially within the electromagnetic field, the second memory device being attached to a second removable portion of the machine and having stored therein second electronic data associated with operation of the machine; and
    communicating the second electronic data between the coupler board and the second memory device using the electromagnetic field.

3. A printing apparatus comprising:
    a coupler board having an antenna attached thereto;
    a first memory device having stored therein first electronic data associated with operation of the printing apparatus, the first memory device being positioned at least partially within an electromagnetic field generated by the antenna; and
    a second memory device having stored therein second electronic data associated with operation of the printing apparatus, the second memory device being positioned at least partially within the electromagnetic field, wherein the first and second electronic data are communicated to the coupler board using the electromagnetic field.

4. A machine comprising:
    a coupler board having an antenna attached thereto;
    a first memory device having stored therein first electronic data associated with operation of the machine, the first memory device having an antenna positioned at least partially within an electromagnetic field generated by the coupler board antenna; and
    a second memory device having stored therein second electronic data associated with operation of the machine, the second memory device having an antenna positioned at least partially within the electromagnetic field generated by the coupler board antenna, wherein the first and second electronic data are communicated to the coupler board using the electromagnetic field.

5. The machine of claim 4, wherein the electromagnetic field has a radiation pattern including a first lobe and a second lobe, the first memory device having its antenna positioned at least partially within the first lobe, and the second memory device having its antenna positioned at least partially within the second lobe.

6. The machine of claim 5, wherein the coupler board antenna extends substantially coplanar with the coupler board, and the coupler board is positioned between the first memory device and the second memory device.

7. The machine of claim 5, wherein the first lobe and the second lobe have substantially the same shape.

8. The machine of claim 4, wherein the first memory device is attached to a removable module, and the first electronic data includes data associated with usage of the module within the machine.

9. The machine of claim 8, wherein the second memory device is a system operating key and the second electronic data includes data associated with at least one of enabling and disabling features of the machine.

10. The machine of claim 4, wherein the first and second memory devices include radio frequency identification tags.

11. A method of communicating data between a coupler board in a machine and removable portions of the machine, the method comprising:
    generating an electromagnetic field using an antenna attached to the coupler board;
    positioning a first memory device having an antenna at least partially within the electromagnetic field, the first memory device being attached to a first removable portion of the machine and having stored therein first electronic data associated with operation of the machine;
    communicating the first electronic data between the coupler board and the first memory device using the electromagnetic field;
    positioning a second memory device having an antenna at least partially within the electromagnetic field, the second memory device being attached to a second removable portion of the machine and having stored therein second electronic data associated with operation of the machine; and
    communicating the second electronic data between the coupler board and the second memory device using the electromagnetic field.

12. The method of claim 11, wherein the electromagnetic field has a radiation pattern including a first lobe and a second lobe, the first memory device having its antenna positioned at least partially within the first lobe, and the second memory device having its antenna positioned at least partially within the second lobe.

13. The method of claim 12, wherein the coupler board antenna extends substantially coplanar with the coupler board, and the first and second memory devices are positioned on opposite sides of the coupler board.

14. The method of claim 11, wherein the first removable portion of the machine is a removable module, and the first electronic data includes data associated with usage of the module within the machine.

15. The method of claim 14, wherein the second removable portion of the machine is a system operating key, and the second electronic data includes data associated with at least one of enabling and disabling operating features of the machine.

16. The method of claim 11, wherein the first and second memory devices include radio frequency identification tags.

17. A printing apparatus comprising:
a coupler board having an antenna attached thereto;
a first memory device having stored therein first electronic data associated with operation of the printing apparatus, the first memory device having an antenna positioned at least partially within an electromagnetic field generated by the coupler board antenna; and
a second memory device having stored therein second electronic data associated with operation of the printing apparatus, the second memory device having an antenna positioned at least partially within the electromagnetic field, wherein the first and second electronic data are communicated to the coupler board using the electromagnetic field.

18. The printing apparatus of claim 17, wherein the electromagnetic field has a radiation pattern including a first lobe and a second lobe, the first memory device having its antenna positioned at least partially within the first lobe, and the second memory device having its antenna positioned at least partially within the second lobe.

19. The printing apparatus of claim 18, wherein the coupler board antenna extends substantially coplanar with the coupler board, and the coupler board is positioned between the first memory device and the second memory device.

20. The printing apparatus of claim 17, wherein the first memory device is attached to a removable module, and the first electronic data includes data associated with usage of the module within the printing apparatus.

21. The printing apparatus of claim 20, wherein the removable module includes hardware for electrostatographic printing.

22. The printing apparatus of claim 20, wherein the second memory device is a system operating key and the second electronic data includes data associated with at least one of enabling and disabling operating features of the printing apparatus.

23. The printing apparatus of claim 17, wherein the first and second memory devices include radio frequency identification tags.

* * * * *